(12) United States Patent
Chou (10) Patent No.: US 7,990,614 B2
(45) Date of Patent: Aug. 2, 2011

(54) PROJECTION SCREEN

(75) Inventor: Wen-Bin Chou, Hsinchu (TW)

(73) Assignee: Coretronic Corporation, Hsin-Chu (TW)

( * ) Notice: Subject to any disclaimer, the term of this patent is extended or adjusted under 35 U.S.C. 154(b) by 114 days.

(21) Appl. No.: 12/588,431

(22) Filed: Oct. 15, 2009

(65) Prior Publication Data
US 2010/0103514 A1    Apr. 29, 2010

(30) Foreign Application Priority Data
Oct. 24, 2008  (TW) ............................... 97140775 A (51) Int. Cl.
*G03B 21/60*  (2006.01)
(52) U.S. Cl. ........................................ 359/454; 359/459
(58) Field of Classification Search .......... 359/454–455, 359/449, 459
See application file for complete search history.

(56) References Cited

U.S. PATENT DOCUMENTS

| | | | |
|---|---|---|---|
| 3,704,055 A * | 11/1972 | Hong | ............................ 359/455 |
| 6,842,282 B2 | 1/2005 | Kuroda et al. | |
| 7,262,912 B2 | 8/2007 | Wood | |
| 7,538,943 B2 * | 5/2009 | Shinbo | .......................... 359/459 |
| 7,826,135 B2 * | 11/2010 | Destain et al. | ................. 359/449 |
| 7,835,078 B2 * | 11/2010 | Ichikawa et al. | .............. 359/443 |
| 2007/0146876 A1 * | 6/2007 | Peterson et al. | .............. 359/449 |

* cited by examiner

*Primary Examiner* — Christopher Mahoney
(74) *Attorney, Agent, or Firm* — Bacon & Thomas, PLLC (57) ABSTRACT

A projection screen is adapted to reflect the projection light generated by a projector. The projection screen includes a light absorbing layer, a light reflection layer connected adjacently to the light absorbing layer, and a light transparent layer. The light transparent layer is disposed on the light absorbing layer and the light reflection layer, and has a total reflection surface, a light emitting surface, and a light incident surface connected adjacently to the total reflection surface. The light incident surface provides a theoretical light convergence point, and the light convergence point and the location of the light reflection layer are in mirror symmetry relative to the total refection surface. The projection light enters into the light transparent layer through the light incident surface for refraction, and travels to the total reflection surface for totally reflection, and then to the light reflection layer for reflecting to the light emitting surface.

16 Claims, 11 Drawing Sheets

PROJECTION SCREEN

BACKGROUND OF THE INVENTION (1) Field of the Invention

The invention relates to a screen, and especially relates to a projection screen.

(2) Description of the Prior Art

Figure 1:
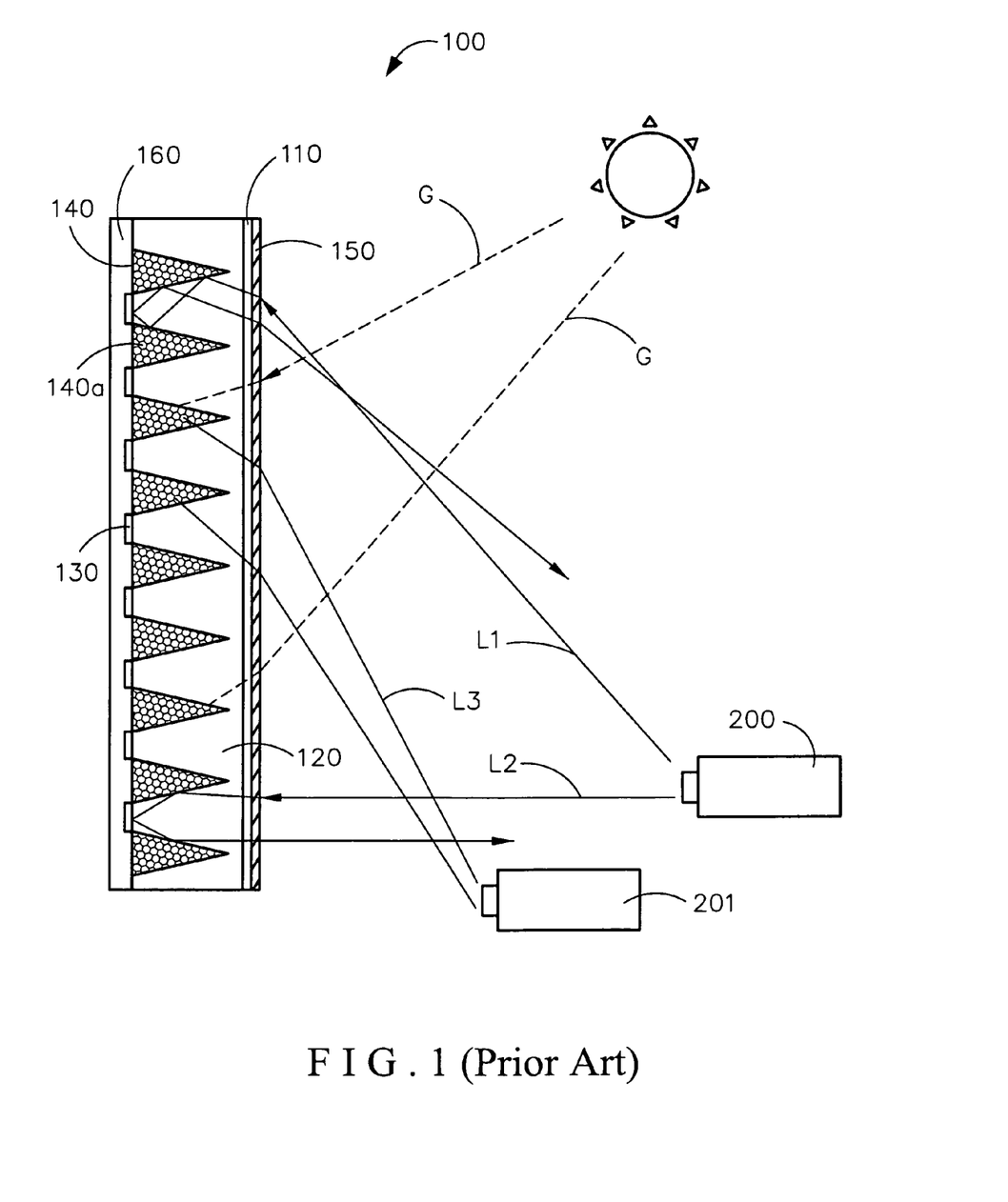
FIG. 1 is a conventional reflective projection screen.

FIG. 1 is a conventional reflective projection screen 100, including a substrate 110, a light transparent layer 120, a light reflection layer 130, a light absorbing layer 140, an light anti-reflection layer 150, and a back protection layer 160. The reflective projection screen 100 is used to reflect image light beams L1 and L2 from a projector 200.

The light anti-reflection layer 150 is attached to the front surface of the substrate 110 and faces the projector 200 to ensure that the image light beams L1,L2 are not reflected by the surface of the substrate 110. The light transparent layer 120 is disposed at the back of the substrate 110, and the section of the light transparent layer 120 is similar to a plurality of ladder units connected to each other. Each of the ladder units has a narrow upside and a wide underside, and the underside is connected with the substrate 110. The light reflection layer 130 is formed above the upside of each of the ladder units of the light transparent layer 120. The light absorbing layer 140 is composed by black particles 140a or light absorbing material filled between adjacent ladder units of the light transparent layer 120.

For the average index of refraction of the light absorbing layer 140 is smaller than the index of refraction of the light transparent layer 120, the image light beams L1,L2 have opportunities to be totally reflected at the boundary interface between the light transparent layer 120 and the light absorbing layer 140. As FIG. 1 shows, after entering the projection screen 100 from the projector 200, the image light beams L1,L2 are refracted by the surface of the substrate 110, and then enter into a space encircled by the light reflection layer 130 and the two interfaces between the light transparent layer 120 and the two adjacent light absorbing layers 140. The image light beams L1, L2 exit out of the projection screen 100 by total reflection of the two interfaces and mirror reflection of the light reflection layer 130.

When the environment light G enters obliquely into the projection screen 100, for the incident angle of the environment light G entering the boundary interface between the light transparent layer 120 and the light absorbing layer 140 is smaller than the critical angle of total reflection, the environment light G is absorbed by the light absorbing layer 140 so as to decrease the visual glare effect caused by the environment light G.

However, if a short focus projector 201 is used to match the projection screen 100, the distance between the short focus projector 201 and the projection screen 100 may be very short. Comparing with the image light beams L1, L2 projected by a common projector 200, a large part of the image light beams L3 projected by the short focus projector 201 is more inclined into the projection screen 100. For the incident angle is smaller than the critical angle of the total reflection, when the image light beams L3 enter into the boundary interface between the light transparent layer 120 and the light absorbing layer 140, the total reflection may not occur and the image light beams L3 may be also absorbed by the light absorbing layer 140, resulting in the invalidation of the projection screen 100.

SUMMARY OF THE INVENTION

Accordingly, the object of the present invention is to provide a projection screen having good reflection effect for the image light beams projected by the projector.

In order to achieve one or part of or all the objectives, or to achieve other objectives, an embodiment of the present invention provides a projection screen adapted to reflect a projection light generated by a projector. The projection screen includes a light absorbing layer, a light reflection layer, and a light transparent layer. The light reflection layer is connected adjacently to the light absorbing layer. The light transparent layer is disposed on the light absorbing layer and the light reflection layer, and has a light incident surface, a total reflection surface, and a light emitting surface. The light incident surface is connected adjacently to one end of the total reflection surface, and another end of the total reflection surface is connected adjacently to the light emitting surface. The light incident layer provides a theoretical light convergence point, and the light convergence point and the location of the light reflection layer are in mirror symmetry relative to the total refection surface. The projection light generated by the projector enters into the light transparent layer through the light incident surface to be refracted thereon, travels to the total reflection surface to be totally reflected thereon, and then travels to the light reflection layer to be reflected to the light emitting surface of the light transparent layer.

One surface of above light reflection layer provides a normal direction, and the total reflection surface and the light emitting surface of the light transparent layer are both planes. An inclination angle formed between the total reflection surface and a theoretical vertical axis parallel to the normal direction. The light incident surface of the light transparent layer includes a curve surface and a section angle plane, and one end of the section angle plane is connected to the curve surface and another end of the section angle plane is connected to the total reflection surface.

For increasing the image viewing angle formed by above projection screen, a diffusion particle layer may be attached on the light emitting surface of the light transparent layer, or the light emitting surface of the light transparent layer is processed into a rough surface. The light emitting surface of the light transparent layer may be at least one plane, at least one curve surface, or the combination of the planes and the curves surfaces. The light incident surface of the light transparent layer includes at least one plane, at least one curve surface, or the combination of the planes and the curves surfaces.

In one embodiment of the present invention, the projection screen includes a plurality of light absorbing layers, a plurality of light reflection layers, and a light transparent layer. The light reflection layers are connected adjacently to the light absorbing layers alternately. The light transparent layer is disposed on the light absorbing layers and the light reflection layers, and has a plurality of micro structure units. The micro structure units correspond to the light reflection layers respectively. Each of the micro structure unit has a light incident surface, a total reflection surface, and a light emitting surface disposed facing the projector orderly. The light emitting surface of each of the micro structure units is connected adjacently to the adjacent light incident surface. In each of the micro structure units, the light incident surface may provide a theoretical light convergence point, and the theoretical light convergence point is in mirror symmetry with the location of the light reflection layer relative to the total reflection surface of the micro structure unit.

In one embodiment of the present invention, the micro structure units include a first micro structure unit and a second micro structure unit. A first light incident surface of the first micro structure unit is different from a second light incident surface of the second micro structure unit.

In one embodiment of the present invention, the surface of the light reflection layer provides a normal direction. A first inclination angle is formed between the total reflection surface of the first micro structure unit and the theoretical vertical axis parallel to the normal direction. A second inclination angle is formed between the total reflection surface of the second micro structure unit and the vertical axis. The first inclination angle is different from the second inclination angle.

Above all, the projection screen in the embodiment or the embodiments of the present invention uses a small area of the light reflection layer disposed in the preset light path, so a large part of the light beams reflected by the light reflection layer come from the projector. Relatively, a large part of the environment light, not traveling along the preset light path, may not reach the light reflection layer easily to be reflected by the light reflection layer, so the image showing on the projection screen may be not interfered by the environment light easily. The structure of the light incident surface and inclination degree of the total reflection surface may be designed according to the incident angle of the image light beam to fit the projection light from the short focus projector. Moreover, the image viewing angle may be controlled by roughening the light incident surface or disposing the diffusion particle layer on the light emitting surface.

Other objectives, features and advantages of the present invention will be further understood from the further technological features disclosed by the embodiments of the present invention wherein there are shown and described preferred embodiments of this invention, simply by way of illustration of modes best suited to carry out the invention.

DESCRIPTION OF THE PREFERRED EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

Figure 2:
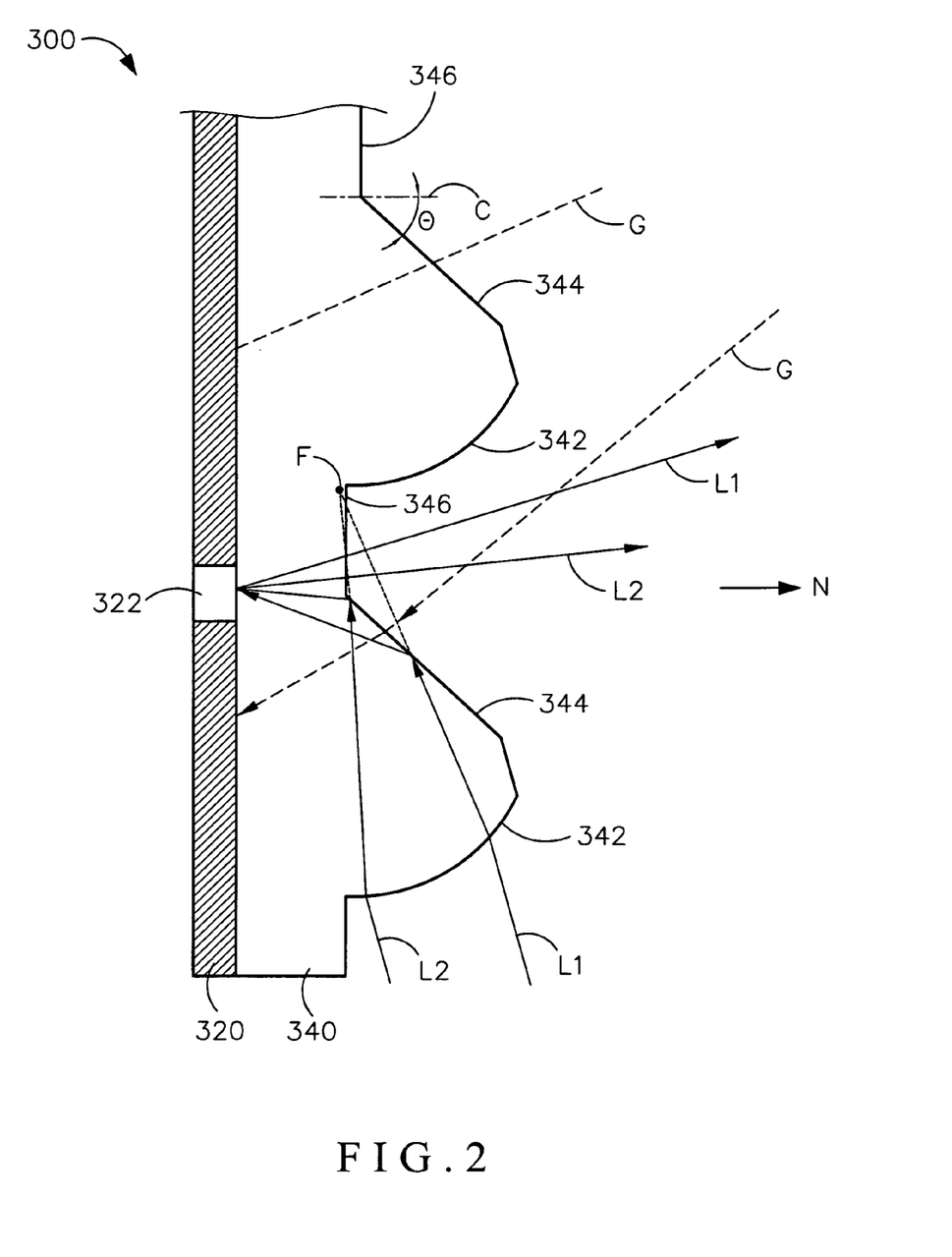
FIG. 2 is a schematic view of the projection screen and the light path according to an embodiment of the present invention.

Refer to FIG. 2 for a schematic view of a projection screen 300 according to an embodiment of the present invention. The projection screen 300 is adapted to reflect the image light beams L1, L2 projected by a projector (not shown) for displaying image. The projection screen 300 includes a light absorbing layer 320, a light reflection layer 322, and a light transparent layer 340. The light reflection layer 322 is connected adjacently to the light absorbing layer 320. The light transparent layer 340 faces the projector and is disposed on the light absorbing layer 320 and the light reflection layer 322. The light transparent layer 340 has a light incident surface 342, a total reflection surface 344, and a light emitting surface 346. The light incident surface 342 is connected adjacently of one end of the total light reflection surface 344, and another end of the total light reflection surface 344 is connected adjacently to the light emitting surface 346. In other words, the light incident surface 342, the total reflection surface 344, and the light emitting surface 346 are disposed orderly and face the projector.

The light incident surface 342 is adapted to converge and focus the light beam entering into the projection screen 300. In the present embodiment, the light incident surface 342 has a protruding curve surface towards the projector, and the light incident surface 342 provides a theoretical convergence point F. For example, the light incident surface 342 may be a surface of a convex lens, the light convergence point F of the light incident surface 342 is the focus of the convex lens. According to different curvatures, the positions of the focus are different. Noticeably, the light convergence point F and the location of the light reflection layer 322 are in mirror symmetry relative to the total reflection surface 344.

In the present embodiment, the surface of the light reflection layer 322 may be a mirror. The direction vertical to the surface of the light reflection layer 322 is defined as a normal direction N. The total reflection surface 344 and the light emitting surface 346 are both planes. An inclination angle θ is formed between the total reflection surface 344 and a theoretical vertical axis C parallel to the normal direction N.

Accordingly, the protruding curve surface of the incident light surface 342 determines the location of the light convergence point F. In order to guide the image light beams L1, L2 to the total reflection layer 344 after passing through the protruding curve surface of the light incident surface 342, when designing the inclination angle θ of the total reflection surface 344, the location and the structure of the light incident surface 342 need to be considered. After the location of the total reflection surface 344 is determined, the location of the light reflection layer 322 may be determined based on the principle of mirror symmetry.

Thus, the image light beams L1, L2 enter the light transparent layer 340 through the light incident surface 342 and are refracted on the light incident surface 342. The image light beams L1, L2 may converge at the light convergence point F theoretically, but in fact, the image light beams L1, L2 are blocked by the total reflection surface 344 before reaching the light convergence point F. So the image light beams L1, L2 are totally reflected on the total reflection surface 344 and converge on the light reflection layer 322 actually, and then are reflected to the light emitting surface 346 by the light reflection layer 322. At last, the image light beams L1, L2 enter eyes of the audiences from the light emitting surface 346.

For the image light beams L1, L2 are actually focused on the light reflection layer 322, a small area of the light reflection layer 322 may be enough, and the usage of the materials of the light reflection layer 322 in fabrication may be decreased. Moreover, due to the small area of the light reflection layer 322, the environment light G not traveling along the light path of the image light beams L1, L2 may not reach the light reflection layer 322 easily after entering into the projection screen 300. The environment light G is easily absorbed by the larger area of the light absorbing layer 300 to avoid interfering the image quality.

In fabrication, the curvature of the protruding curve surface of the light incident surface 342 and the inclination angle θ of the total reflection surface 344 are designed according to the incident angle of the image light beams L1, L2. In other words, based on the concept of the present embodiment, a proper structure of the projection screen 300 may be designed according to the distance between the projector and the projection screen 300.

Figure 3A:
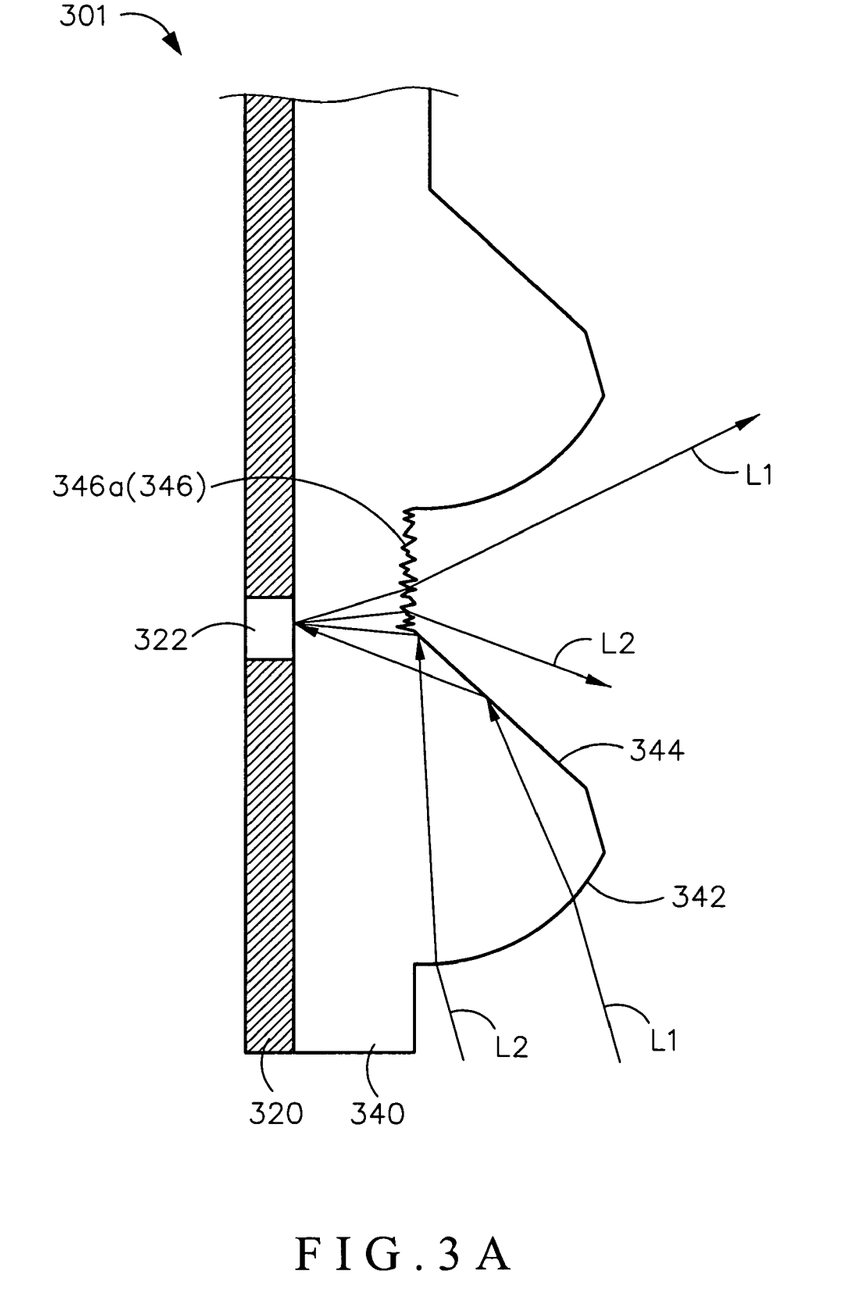
FIG. 3A and FIG. 3B are schematic views of the light emitting surface of the projection screen according to an embodiment of present invention.

Referring to FIG. 3A, to enlarge the image viewing angle, in the projection screen 301 of an embodiment, the light emitting surface 346 of the light transparent layer 340 may be processed into a rough surface 346a. As FIG. 3A shows, the image light beams L1, L2 reflected by the light reflection layer 322 may appear a more scattered light emitting angle by scattering effect after passing through the rough surface 346a.

Figure 3B:
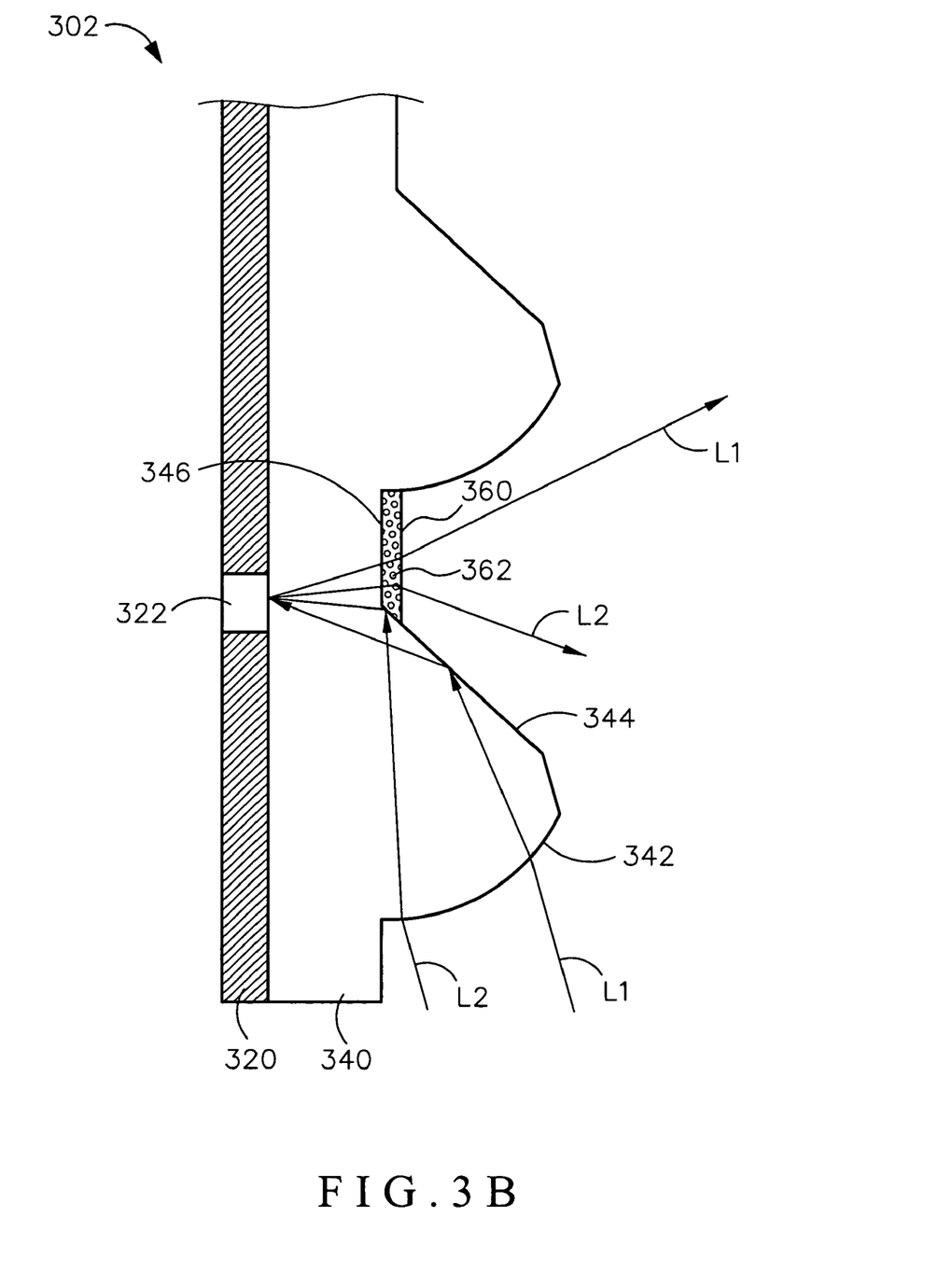

Referring to FIG. 3B, to enlarge the image viewing angle, in the projection screen 302 of an embodiment, a diffusion particle layer 360 is attached on the light emitting surface 346 of the light transparent layer 340. The diffusion particle layer 360, for instance, a mixture of colloid and transparent particles 362, is coated on the light emitting surface 346. As FIG. 3B shows, the image light beams L1, L2 reflected by the light reflection layer 322 pass through the diffusion particles layer 360 and diffuse after refracted by the transparent particles 362. By the way, the image light beams L1, L2 may also be diffused by the diffusion particle layer 360 directly covering on the surface of the light reflection layer 322.

As a summary of FIG. 3A and FIG. 3B, the image viewing angle may be controlled by roughening the light emitting surface 346 or covering the light emitting surface 346 with the diffusion particles layer 360.

Figure 4:
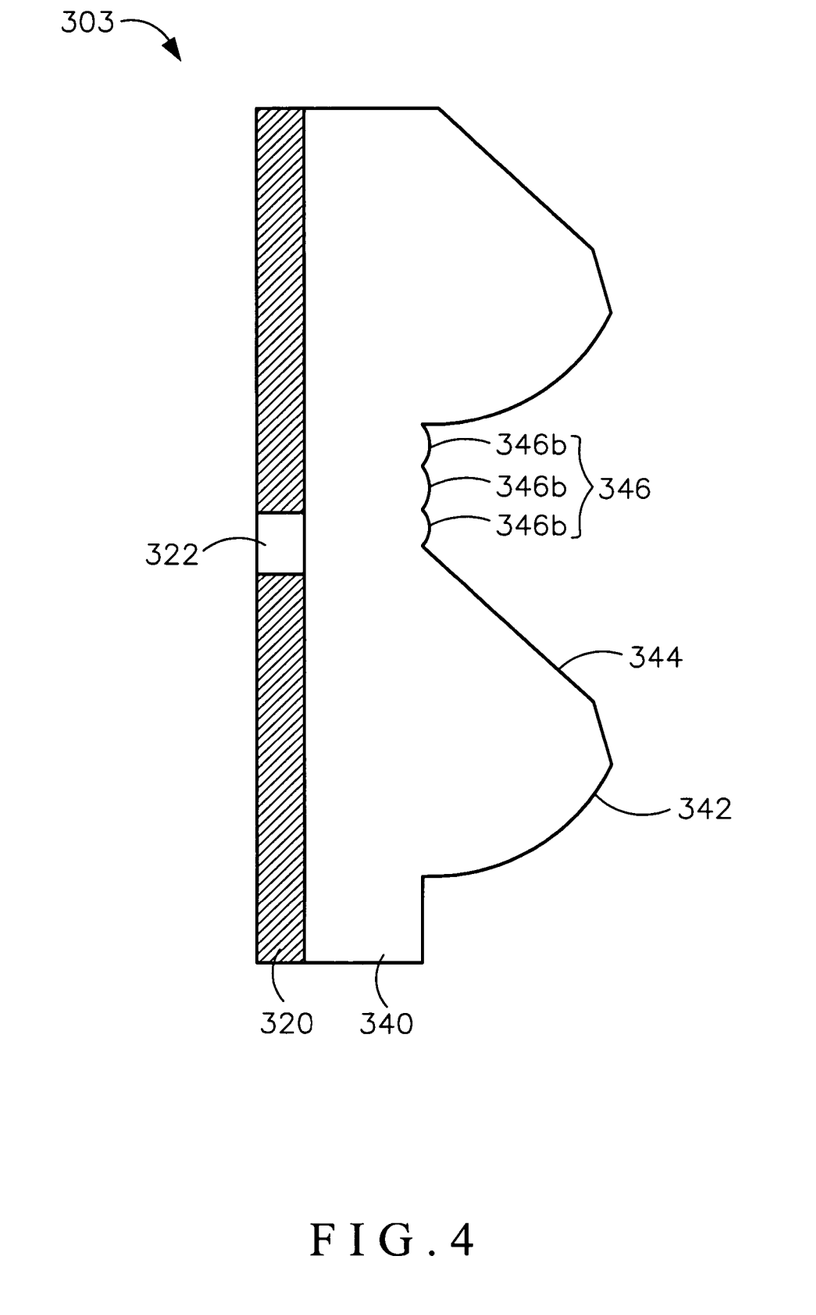
FIG. 4 is a schematic view of the light emitting surface of the projection screen according to an embodiment of the present invention.

Referring to FIG. 4, in the projection screen 303 of an embodiment, the light emitting surface 346 of the light transparent layer 340 includes one or a plurality of protruding curve surfaces 346b, and the protruding curve surface 346b makes the light emitting surface 346 have the same function as a convex lens for converging light to increase the front brightness of the image. In other embodiments, the light emitting surface 346 may also include a concave surface, a convex and concave alternating surface, or an irregular surface, etc.

Figure 5:
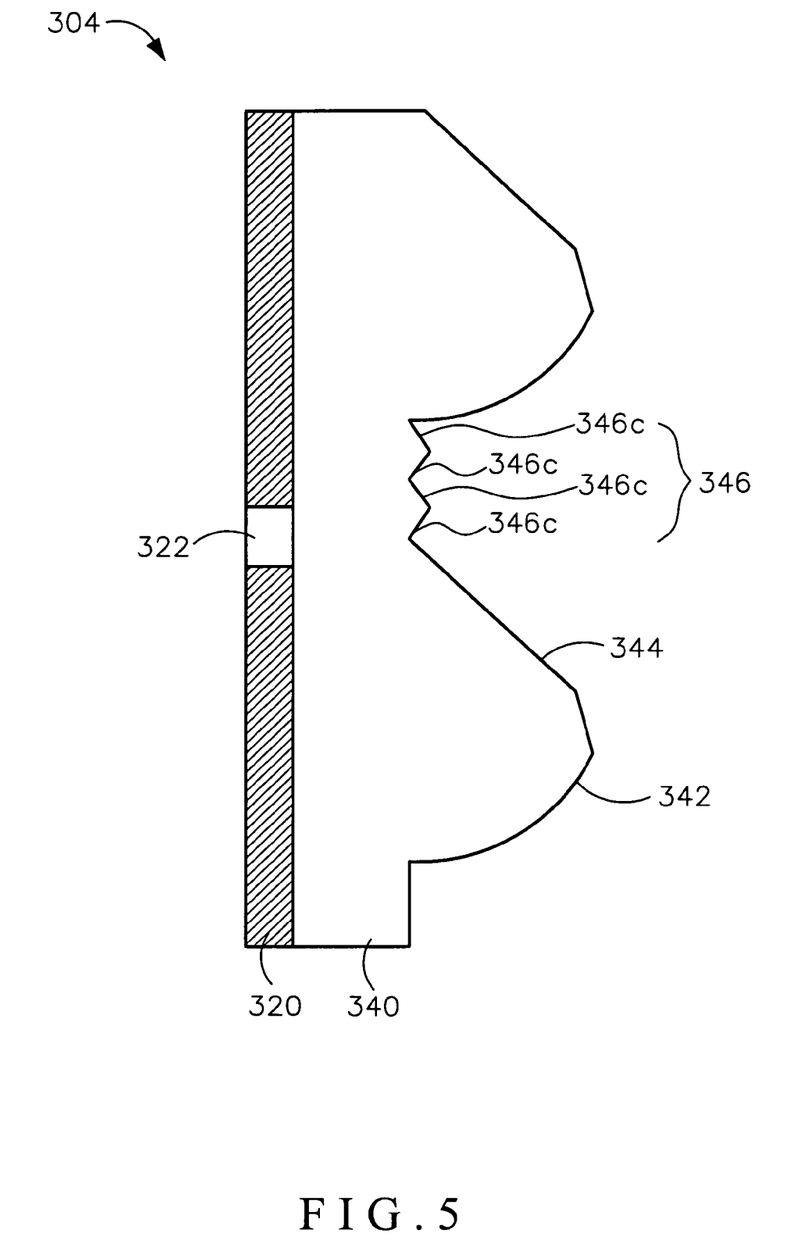
FIG. 5 to FIG. 7 are schematic views of the light emitting surface of the projection screen according to an embodiment of the present invention.

Referring to FIG. 5, in the projection screen 304 of an embodiment, the light emitting surface 346 of the light transparent layer 340 has a plurality of planes 346c connected serially into a prism structure for making the light emitting surface 346 have a function of the prism structure and converge light to increase the front brightness of the image. In other embodiments, the shape of the light emitting surface 346 may be similar to an inner surface of a groove or a surface of a convex column.

Figure 6:
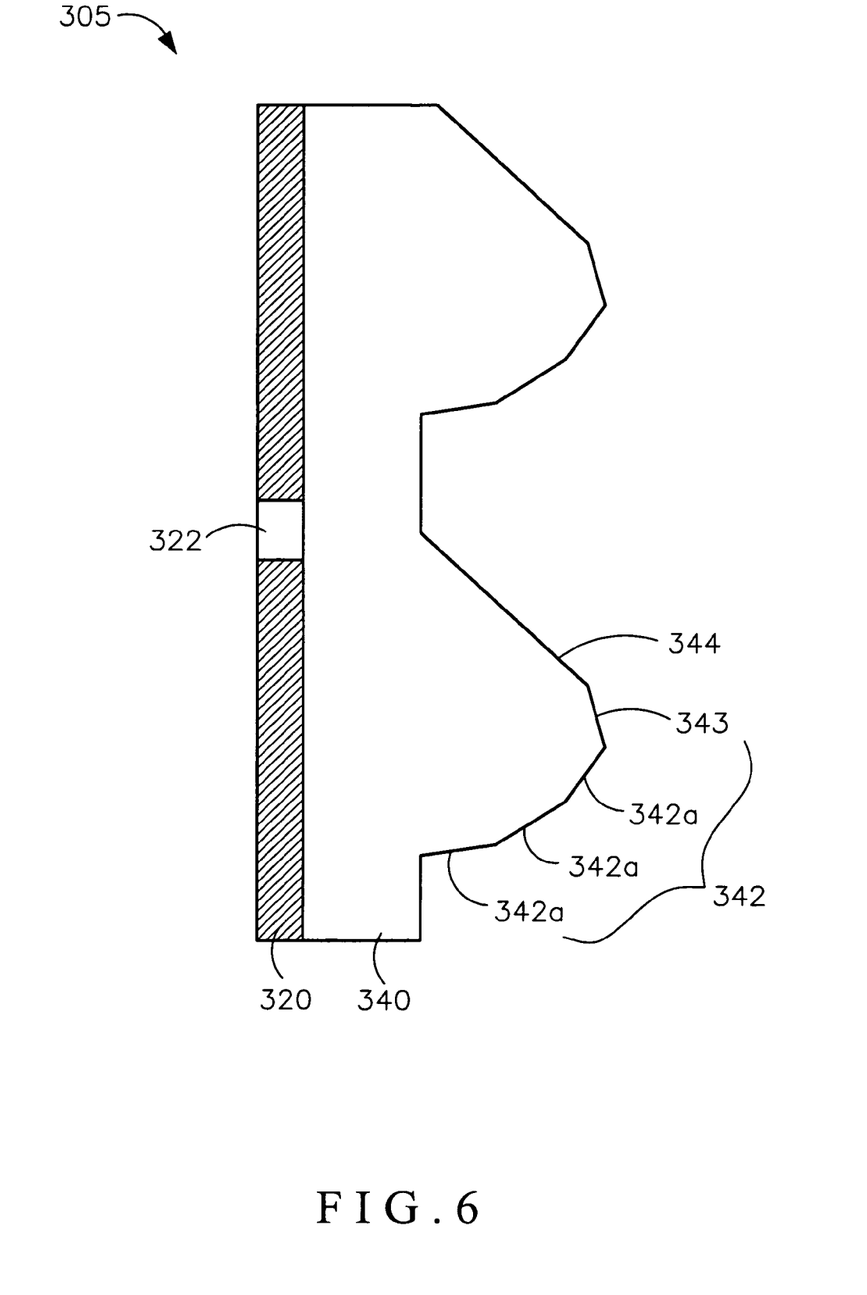

The light incident surface 342 in above embodiments takes an example of a single curve surface for description, but the present invention is not limited to this. Referring to FIG. 6, in the projection screen 305 of an embodiment, the light incident surface 342 of the light transparent layer 340 includes a convex surface composed by a plurality of planes 342a, and a connecting plane 343. One end of the connecting plane 343 connects one end of the convex surface, and another end of the connecting plane 343 connects one end of the total reflection surface 344. A corner is formed between every two adjacent planes 342a. The image light beam entering through the convex surface is leaded to the total reflection surface 344 and converged on the light reflection layer 322.

Figure 7:
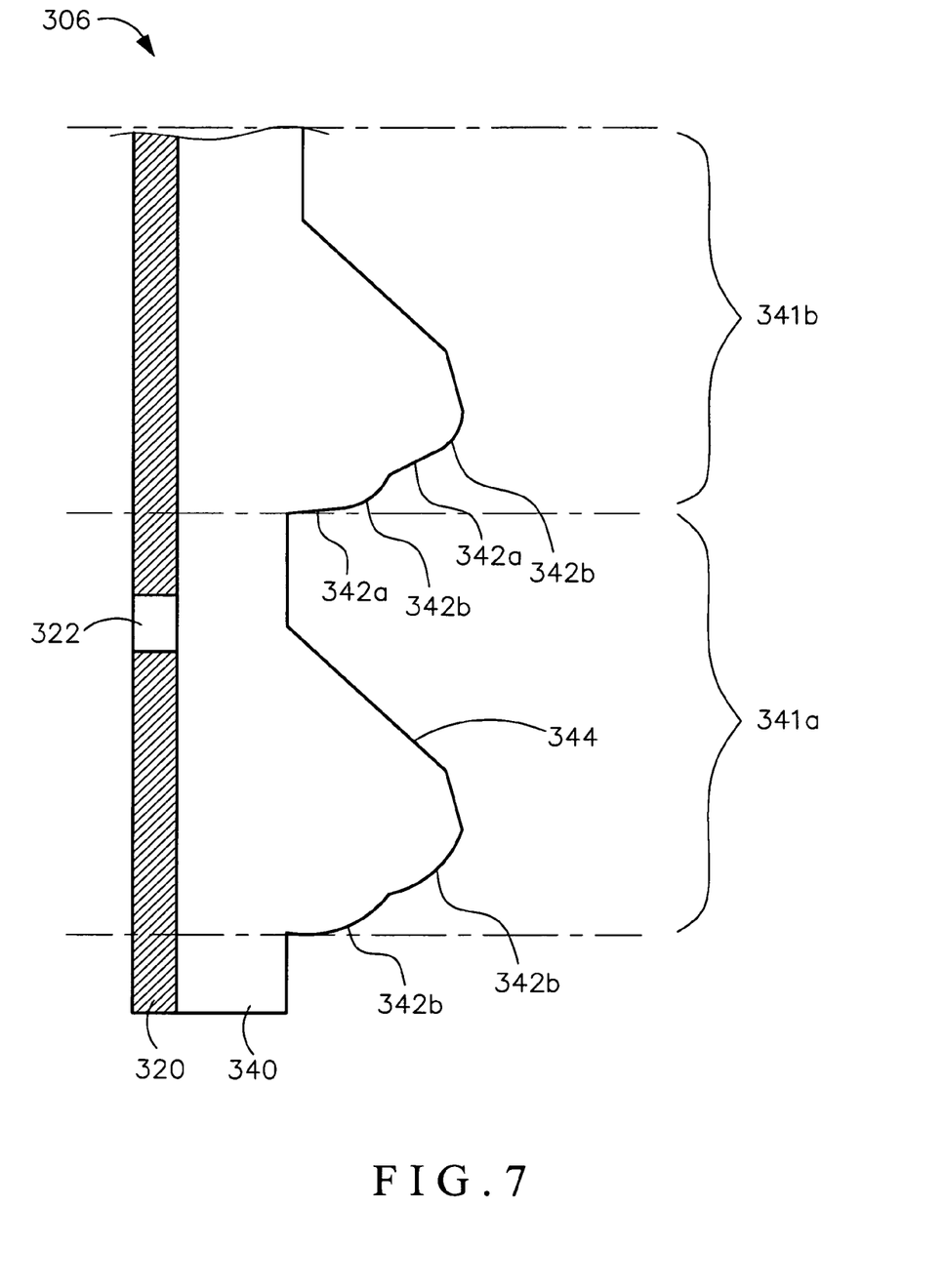

Referring to FIG. 7, in the projection screen 306 of an embodiment, the convex surface of the light incident surface 342 in FIG. 6 is replaced by a plurality of curve surfaces 342b. Theoretically, the curve surfaces 342b provide a plurality of light convergence points close to each other. The light convergence points are located in a certain area, and the area is in mirror symmetry with the light reflection layer 322 relative to the total reflection surface 344.

In the above embodiment or the above embodiments, the light incident surface 342, the total reflection surface 344, and the light emitting surface 346 may be regarded as a micro structure unit of the light transparent layer 340. As FIG. 7 shows, micro structure units 341a, 341b may have different types of the light incident surfaces 342. For example, the light incident surface 342 of the micro structure unit 341b has a surface composed by a plurality of planes 342a and a plurality of curves surfaces 342b, different from the light incident surface 342 of the micro structure unit 341a. Moreover, the micro structures 341a, 341b may have different types of the light emitting surfaces 346. Either the types of the light incident surface 342 or the types of the light emitting surface 346 may be selected from embodiments of the present invention and their combinations according to actual requirements.

In summary, the light emitting surface 346 of the light transparent layer 340 may be a plane, a curve surface, or the composition of a plurality of curve surfaces, even a combination of a plurality of planes and curve surfaces. The light incident surface 342 of the light transparent layer 340 may include one or more curve surfaces, or a convex surface composed by a plurality of planes, or a surface combined by a plurality of planes and curve surfaces.

Figure 8:
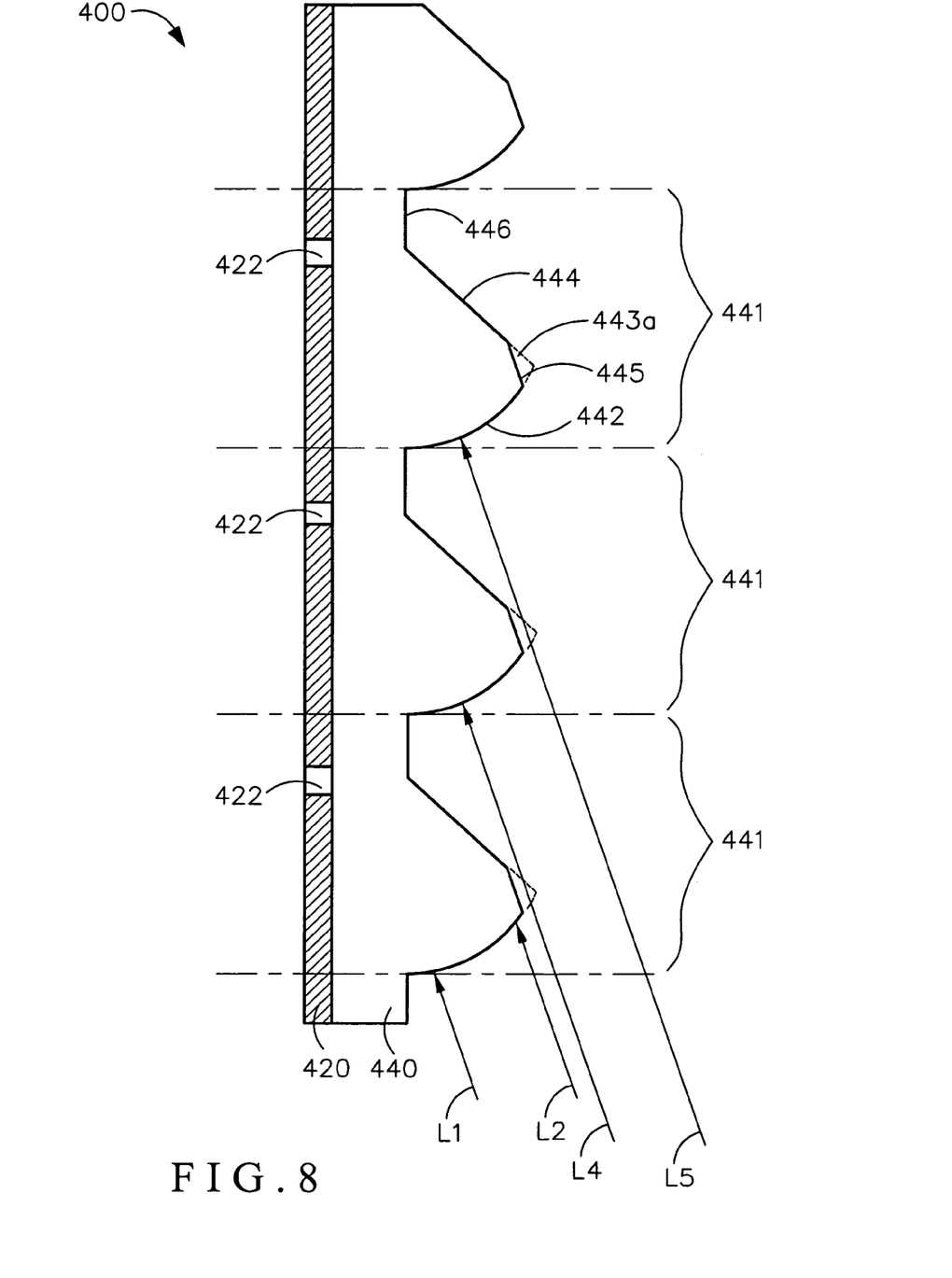
FIG. 8 to FIG. 10 are schematic views of the micro structure unit of the light transparent layer of the projection screen according to an embodiment of the present invention.

Referring to FIG. 8, in an embodiment, the projection screen 400 has a plurality of light absorbing layers 420 and a plurality of light reflection layers 422. The light reflection layers 422 are connected adjacently to the light absorbing layers 420 alternately. The light transparent layer 440 includes a plurality of micro structure units 441 disposed on the light absorbing layers 420 and the light reflection layers 422. The micro structure units 441 correspond to the light reflection layers 422 respectively. Each of the micro structure units 441 has a light incident surface 442, a total reflection surface 444, and a light emitting surface 446 disposed orderly towards the projector. The light emitting surface 446 of each of the micro structure units 441 is connected adjacently to the adjacent light incident surface 442.

As above mentioned, in each of the micro structure units 441, the light incident surface 442 provides a light convergence point theoretically. The light convergence point and the light reflection layer 422 corresponding to the micro structure unit 441 are in mirror symmetry relative to the total reflection surface 444 of the micro structure unit 441.

As FIG. 8 shows, the light incident surface 442 includes the above mentioned protruding curve surface and a section surface 445. The extension of the protruding curve surface meets the extension of the total reflection surface 444, and a section angle 443a is formed by the extension of the protruding curve surface and the extension of the total reflection surface 444 is defined. The bottom of the section angle 443a is the section surface 445. A part of the image light beams L5,L4 may enter into the light transparent layer 440 through the section angle 443a. If without the section angle 443, the part of the image light beams L5, L4 may not reach the light reflecting area along the preset light path. If with the section angle 443a, the part of the image light beams L5, L4 may pass through the section angle 443a straightly to enter into the light incident surface 442 of the next micro structure unit 441 to strengthen the convergence effect of the projection screen for the image light beams L5, L4.

Figure 9:
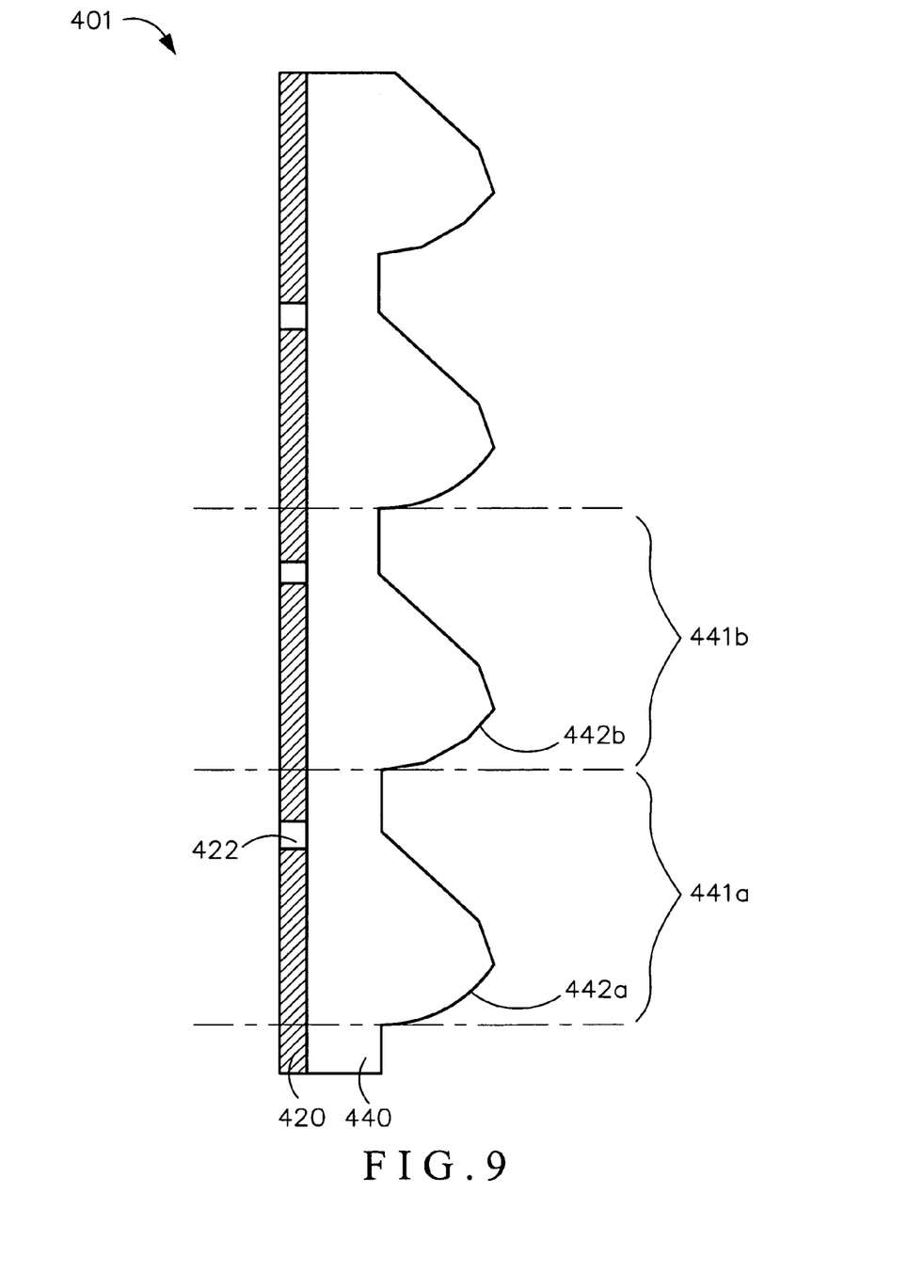

Referring to FIG. 9, in an embodiment, a plurality of micro structure units of the projection screen 401 have a first micro structure unit 441a and a second micro structure unit 441b. The type of the light incident surface 442a of the first micro structure unit 441a is a curve surface, different from the light incident surface 442b of the second micro structure unit 441b having a plurality of planes composing a convex surface.

Figure 10:
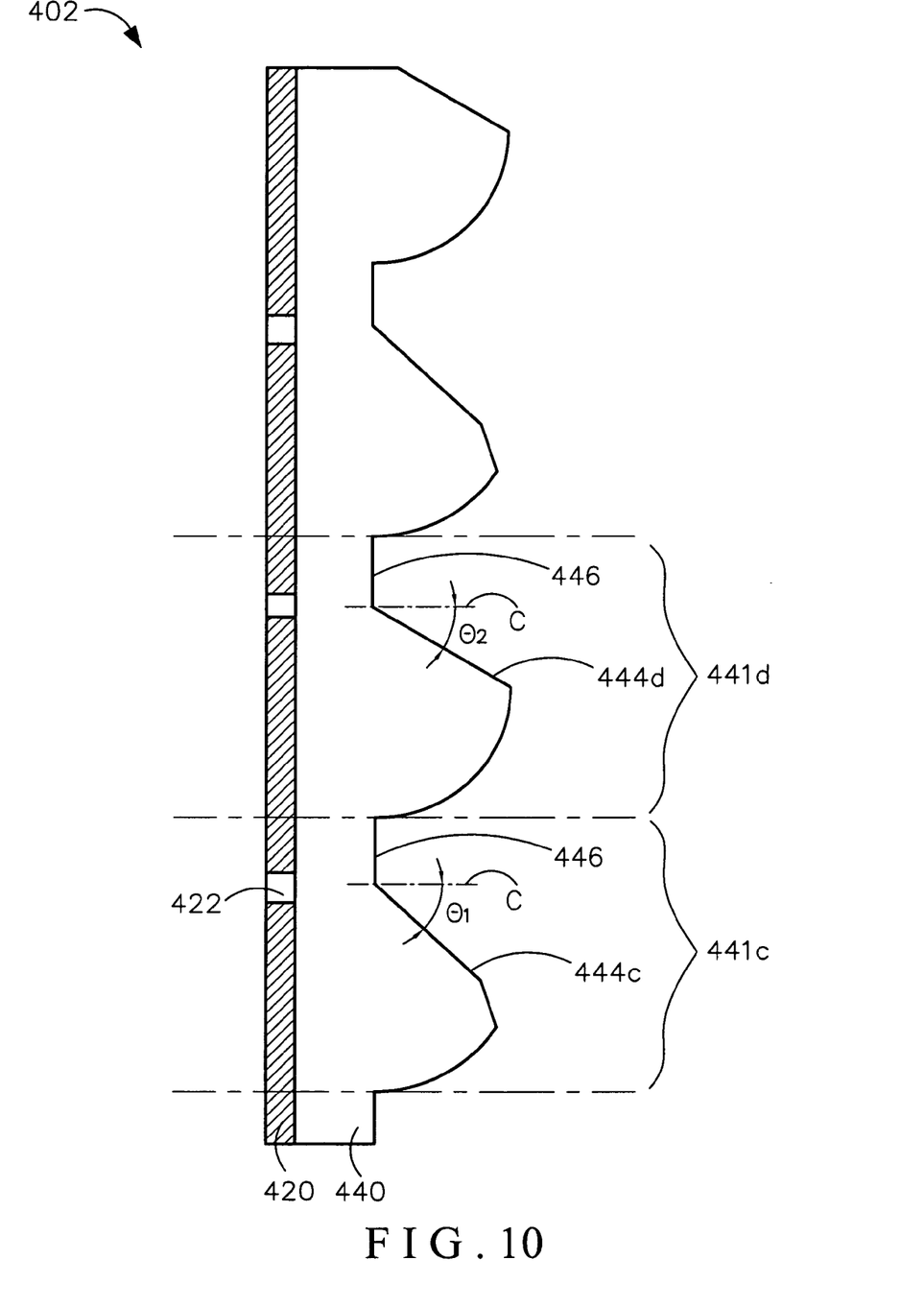

Referring to FIG. 10, in an embodiment, a plurality of micro structure units of the projection screen 400 includes a first micro structure unit 441c and a second micro structure unit 441d. A first inclination angle θ1 is formed between the total light reflection surface 444c of the first micro structure unit 441c and the vertical axis C, and a second inclination angle θ2 is formed between the total light reflection surface 444d of the second micro structure unit 441d and the vertical axis C. The first inclination angle θ1 may be different from the second inclination angle θ2. It means that the inclination level of the total light reflection surface 444c may be different from the inclination level of the total light reflection surface 444d.

In summary, the projection screen in the embodiment or the embodiments of the present invention may need a small area of the light reflection layer disposed in the preset light path, and a large part of the light beams reflected by the light reflection layer come from the projector. Thus the image showing on the projection screen may not be interfered by the environment light easily. The structure of the light incident surface and the inclination degree of the total reflection surface may be designed according to the incident angle of the image light beam to fit the projection light from the short focus projector. Moreover, the image viewing angle may be controlled by roughening the light incident surface or disposing the diffusion particle layer on the light emitting surface.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A projection screen, adapted to reflect a projection light generated by a projector, comprising:
    a light absorbing layer;
    a light reflection layer, connected adjacently to the light absorbing layer; and
    a light transparent layer, disposed on the light absorbing layer and the light reflection layer, having a light incident surface, a total reflection surface, and a light emitting surface, wherein one end of the total reflection surface is connected adjacently to the light incident surface and another end of the total reflection surface is connected adjacently to the light emitting surface,
    wherein the light incident surface provides a theoretical light convergence point, the theoretical light convergence point is in mirror symmetry with the location of the light reflection layer relative to the total reflection surface,
    wherein the projection light of the projector is capable of entering into the light transparent layer through the light incident surface to be refracted thereon, traveling to the total reflection surface to be totally reflected thereon, and traveling to the light reflection layer to be reflected to the light emitting surface of the light transparent layer.

2. The projection screen of claim 1, wherein one surface of the light reflection layer provides a normal direction, the total reflection surface and the light emitting surface of the light transparent layer are both planes, and an inclination angle is formed between the total reflection surface and a theoretical vertical axis parallel to the normal direction.

3. The projection screen of claim 2, wherein the light incident surface of the light transparent layer comprises a curve surface and a section angle plane, one end of the section angle plane is connected to the curve surface, and another end of the section angle plane is connected to the total reflection surface.

4. The projection screen of claim 1, wherein the light emitting surface of the light transparent layer is a rough surface.

5. The projection screen of claim 1, further comprising a diffusion particle layer disposed on the light emitting surface of the light transparent layer.

6. The projection screen of claim 1, wherein the light emitting surface of the light transparent layer is selected from the group consisting of at least one plane and at least one curve surface.

7. The projection screen of claim 1, wherein the light incident surface of the light transparent layer is selected from the group consisting of at least one plane and at least one curve surface.

8. A projection screen, adapted to reflect a projection light generated by a projector, comprising:
 a plurality of light absorbing layers;
 a plurality of light reflection layers, connected adjacently to the light absorbing layers alternately;
 a light transparent layer, disposed on the light absorbing layers and the light reflection layers, comprising a plurality of micro structure units corresponding to the light reflection layers respectively, each of the micro structure units having a light incident surface, a total reflection surface, and a light emitting surface disposed facing the projector orderly, the light emitting surface of each of the micro structure units connected adjacently to the adjacent light incident surface;
 wherein in each of the micro structure units, the light incident surface provides a theoretical light convergence point, the theoretical light convergence point is in mirror symmetry with the location of the corresponding light reflection layer relative to the total reflection surface, the projection light of the projector is capable of entering into the light transparent layer through the light incident surface to be refracted thereon, traveling to the total reflection surface to be totally reflected thereon, and traveling to each of the light reflection layers to be reflected to the light emitting surface.

9. The projection screen of claim 8, wherein the surface of each of the light reflection layers provides a normal direction, the total reflection surface and the light emitting surface of the light transparent layer are planes, and an inclination angle is formed between the total reflection surface and a theoretical vertical axis parallel to the normal direction in each of the micro structure units.

10. The projection screen of claim 9, wherein in each of the micro structure units, the light incident surface has a curve surface and a section angle plane, one end of the section angle plane is connected to the curve surface and another end of the section angle plane is connected to the total reflection surface.

11. The projection screen of claim 8, wherein the micro structure units comprise a first micro structure unit and a second micro structure unit, a first light incident surface of the first micro structure unit is different from a second light incident surface of the second micro structure unit.

12. The projection screen of claim 8, wherein the surface of each of the light reflection layers provides a normal direction, the micro structure units comprise a first micro structure unit and a second micro structure unit, a first inclination angle is formed between a first total reflection surface of the first micro structure unit and a theoretical vertical axis parallel to the normal direction, a second inclination angle is formed between a second total reflection surface of the second micro structure unit and the theoretical vertical axis, and the first inclination angle is different from the second inclination angle.

13. The projection screen of claim 8, wherein the light emitting surface of the light transparent layer comprises at least one rough surface.

14. The projection screen of claim 8, further comprising at least one diffusion particle layer disposed on the light emitting surface of the light transparent layer.

15. The projection screen of claim 8, wherein the light emitting surface of the light transparent layer is selected from the group consisting of at least one plane and at least one curve surface.

16. The projection screen of claim 8, wherein the light incident surface of the light transparent layer is selected from the group consisting of at least one plane and at least one curve surface.

* * * * *